United States Patent [19]

Koch et al.

[11] Patent Number: 4,798,640
[45] Date of Patent: Jan. 17, 1989

[54] TIRE REPAIR BY "PATCH ONLY" METHOD

[75] Inventors: Russell W. Koch, Hartville, Ohio; Douglas D. Snyder, Tempe, Ariz.

[73] Assignee: The Firestone Tire & Rubber Company, Akron, Ohio

[21] Appl. No.: 133,097

[22] Filed: Dec. 14, 1987

Related U.S. Application Data

[60] Division of Ser. No. 913,421, Sep. 30, 1986, Pat. No. 4,732,196, which is a continuation of Ser. No. 767,998, Aug. 21, 1985, abandoned, which is a continuation of Ser. No. 584,426, Feb. 28, 1984, abandoned.

[51] Int. Cl.⁴ ................. B32B 35/00; B60C 21/02
[52] U.S. Cl. ................. 156/95; 152/367; 152/370; 156/97; 156/98; 428/63
[58] Field of Search ............... 152/367, 370; 156/94–97, 98; 428/63

[56] References Cited

U.S. PATENT DOCUMENTS

| | | |
|---|---|---|
| 3,143,156 | 8/1964 | Fagert et al. . |
| 3,644,256 | 2/1972 | Broisman . |
| 3,718,587 | 2/1973 | Bhakuni et al. . |
| 3,755,261 | 8/1973 | VanGulich . |
| 3,779,794 | 12/1973 | DeSantis . |
| 3,834,934 | 9/1974 | Broisman . |
| 3,888,831 | 6/1975 | Kogon . |
| 3,966,530 | 6/1976 | Cutts et al. . |
| 3,991,255 | 11/1976 | Blaskiewicz . |
| 4,085,283 | 4/1978 | Otter et al. . |
| 4,125,522 | 11/1978 | Becker . |
| 4,136,219 | 1/1979 | Odam et al. . |
| 4,143,454 | 3/1979 | Utsunomiya et al. . |
| 4,158,378 | 6/1979 | Pearson et al. . |
| 4,240,852 | 12/1980 | Gomberg . |
| 4,300,970 | 11/1981 | Honda et al. . |
| 4,311,181 | 1/1982 | Hausch . |
| 4,327,138 | 4/1982 | Hausch . |
| 4,352,704 | 10/1982 | Williams et al. . |
| 4,399,852 | 8/1983 | Hausch . |
| 4,401,145 | 8/1983 | Hausch . |
| 4,434,832 | 3/1984 | Koch et al. . |
| 4,435,456 | 3/1984 | Hausch . |
| 4,465,535 | 8/1984 | Fieldhouse et al. . |
| 4,485,135 | 11/1984 | Koch . |
| 4,485,136 | 11/1984 | Koch . |
| 4,544,427 | 10/1985 | Hausch . |
| 4,618,519 | 10/1986 | Koch et al. ............... 428/63 |

FOREIGN PATENT DOCUMENTS

| | | |
|---|---|---|
| 2210508 | 12/1972 | France . |
| 1121489 | 8/1968 | United Kingdom . |
| 1352645 | 5/1974 | United Kingdom . |

*Primary Examiner*—Robert A. Dawson
*Attorney, Agent, or Firm*—D. N. Hall

[57] ABSTRACT

A repaired elastomer article having a cut or crack entirely therethrough. A treating agent is located about the cut portion on the inner surface of the article and an amine curable polymer or prepolymer layer resides over said treating agent. A cured elastomeric patch resides over said curable polymer. Since the amine curable polymer cures at ambient temperatures, the repair of the elastomer article can occur on site. The invention is especially useful in the repair of tires.

18 Claims, 1 Drawing Sheet

TIRE REPAIR BY "PATCH ONLY" METHOD

CROSS REFERENCE

This Patent Application is a division of application Ser. No. 913,421, filed Sept. 30, 1986, now U.S. Pat. No. 4,732,196, which in turn is a continuation of Ser. No. 767,998, filed Aug. 21, 1985, now abandoned which in turn is a continuation of Ser. No. 584,426, filed Feb. 28, 1984, now abandoned, for Tire Repair By "Patch Only" Method.

TECHNICAL FIELD

The present invention relates to a composition and method for the repair of elastomeric articles having a crack/cut therein Which is repaired with a cured patch. More specifically, the present invention relates to the use of a treating agent and an amine curable polymer to adhere the patch to the crack/cut area.

BACKGROUND ART

Heretofore, reinforced rubber articles such as giant tires having an opening therein have been repaired utilizing an uncured patch. Generally, the tire was taken to a retread or rubber repair shop where the damaged area was removed. Generally, an all-purpose gum rubber was applied to the opening. On the interior side of the article, the general area of the opening was buffed and a conventional rubber cement applied thereto. Then, an uncured patch was applied. The gum rubber as well as the adhesive was then cured in a mold by applying heat thereto or through utilizing steam heat for a period of approximately 8 to 12 hours.

Prior art patches fall into two classes, the chemical cure patches which are high in cost and provide only poor adhesion to the substrate and uncured patches which require the use of heat for proper cure and adhesion. Unlik.e the method of heat application for the gum rubber filler, a rather sophisticated process must be used to cure this latter type of patch, to wit, a tire mold or similar device. Thus when a patch is required, an on-the-spot or in situ repair is exceedingly cumbersome at best and in most cases impossible, requiring the article to be returned to the shop.

The present invention utilizes a cured rubber patch secured to the elastomer substrate through an adhesive system which is curable at ambient temperatures. There is therefore no need for the use of a tire mold to effect repair and the article can easily and quickly be treated in the field, saving both time and expense. The adhesive system utilizes an amine curable polyurethane or other prepolymer and a treating agent.

Considering the prior art, U.S. Pat. Nos. 3,755,261 to VanGulick; 3,888,831 to Kogan; 3,834,934 to Broisman; 3,644,256 also to Broisman; and 3,718,587 to Bhakuni relate to amine curable curing agents, amine curable polymers, or R.F.L. type adhesives. However, these patents lack any suggestion of applicants' treating agent or repair of an elastomer article.

U.S. Pat. No. 3,779,794 to DeSantis relates to a moisture-curable polyurethane sealant primer system, whereas U.S. Pat. No. 4,085,283 to DenOtter relates to flame retardants utilized in cyanuric acid derivatives. Hughson Chemical Division, Lord Corporation, Product No. PS-2682-71 relates to a surface primer for elastomeric substances utilizing a proprietary compound thought to be mono- or dichloroisocyanuric acid. An article entitled "Room Temperature Vulcanizing Adhesive Based on Ethylene-Propylene-Diene Terpolymer," Cantor, Uniroyal, Paper No. 18, presented to the Division of Rubber Chemistry of the American Chemical Society, Denver, Colo., Oct. 10, 1973 relates to various oxidants which effect ambient temperature cures of E.P.D.M.

U.S. Pat. No. 4,136,219 to Oldam relates to a polyurethane paint which is applied to vulcanized rubbers. British Pat. No. 1,352,645 relates to a polyurethane paint which is applied to vulcanized rubbers.

U.S. Pat. No. 4,125,522 to Becker relates to a polyurethane adhesive, whereas U.S. Pat. No. 3,966,530 to Cutts relates to triazoline diones which are utilized in lieu of chlorinated or halogenated donors for treating elastomeric surfaces to improve adhesion.

U.S. Pat. No. 3,143,156 relates to utilizing a non-fully cured plug to repair an aperture.

U.S. Pat. No. 4,143,454 to Utsonomiya relates to a method of attaching connecting parts of an offshore structure wherein a liquid rubber is applied over a treating solution which may contain a halogen molecule. As such, this reference lacks applicants' treating agent as well as repair of an elastomeric article having a patch thereon.

U.S. Pat. No. 4,158,378 to Pearson relates to a cured rubber tire having a specific polyurethane therein and to a chlorine water treatment. Hence, Pearson also fails to teach or suggest applicants' recited treating agent as well as the patched article.

British Pat. No. 1,352,645 relates to N-halogen sulfonamide treating agents which halogenize surfaces of synthetic and/or natural rubbers.

U.S. Pat. No. 3,991,255 to Blaskjiewicz relates to the adhesion of a polyurethane to an EPDM surface utilizing various adhesives, however, Blaskjiewicz does not use his treating agent to form a treating layer and utilizes elevated temperatures.

U.S. Pat. No. 4,300,970 to Honda does not disclose amine curable resins or an ambient temperature cure.

U.S. Pat. No. 4,240,852 to Gomberg relates only to the use of a cyanoacrylate adhesive.

U.S. Pat. No. 4,352,704 to Williams relates to applying tire tread to a tire. This patent lacks any suggestion of applicants' treating agent or the repair of a tire aperture.

U.S. Pat. Nos. 4,327,138 and 4,399,852 to Hausch fail to diclose a cured rubber patch in repairing a rubber article. Similarly U.S. Pat. Nos. 4,401,145 and 4,311,181 also to Hausch relate to an indicia and not to any cured patch.

One prior art method of repairing a tire article relates to the utilization of a proprietary compound thought to be a mixture of rubber and accelerators which is applied to the aperture and then cured. In general, a very poor adhesion results and heat is required.

DISCLOSURE OF THE INVENTION

It is therefore an aspect of the present invention to provide a repaired reinforced elastomer article in which a cut portion thereof has a cured rubber patch on the interior side thereof.

It is a further aspect of the present invention to provide a reinforced elastomer article having a patch thereon, as above in which an amine curable polymer and a treating agent adheres said patch to said article.

It is still a further aspect of the present invention to provide a reinforced elastomer article having a patch thereon, as above, in which said amine curable polymer or prepolymer cures at ambient temperature.

It is a further aspect of the present invention to provide a reinforced elastomer article having a patch thereon, as above, wherein said patch abates or eliminates air leaks through said cut area.

It is a further aspect of the present invention to provide a reinforced elastomer article having a patch thereon, as above, wherein said cured rubber patch has cords therein.

It is a further aspect of the present invention to provide a reinforced elastomer article having a patch thereon, as above, wherein said elastomer may also be used to fill an enlarged cut portion through the cord body for the purpose of preventing rocks or other foreign material from further damaging the cord body of the tire and/or patch.

It is still a further aspect of the present invention to provide a reinforced elastomer article having a patch thereon, as above, wherein said repaired elastomer article is a tire, a conveyor belt, or the like.

These and other aspects of the present invention will become more apparent from the repaired elastomer article, comprising:

said article having a crack/cut extending therethrough, a treating agent, said treating agent applied to the inner surface of said article and surrounding said crack/cut; said treating agent selected from a group consisting of N-haloimides, and combinations thereof;

an amine curable polymer or prepolymer, said amine curable polymer or prepolymer residing on said treated surface; and a cured elastomer patch, said patch residing over said amine curable polymer or prepolymer, said amine curable polymer or prepolymer bonded to said patch and said elastomer article at ambient temperature.

BEST MODE FOR CARRYING OUT THE INVENTION

Figure 1:
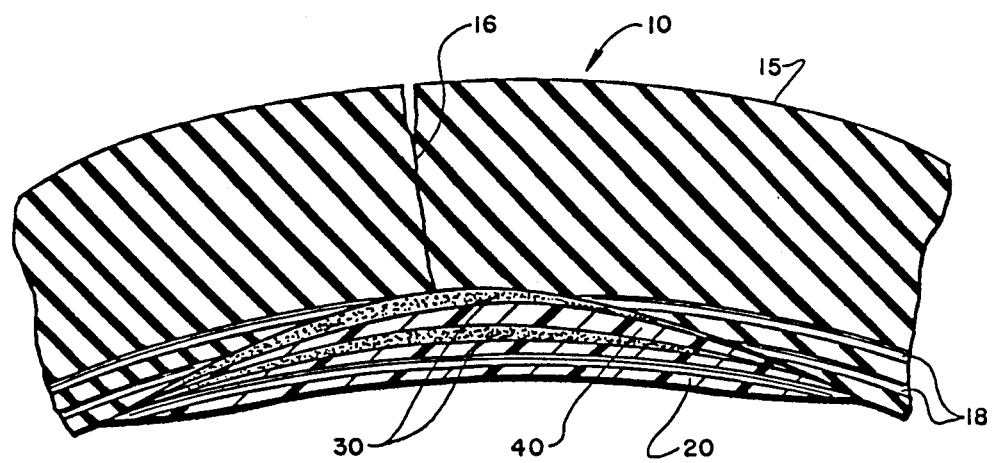
FIG. 1 relates to cross sectional view showing the repair of a reinforced elastomer article having a crack/cut extending completely through according to the present invention.

According to the present invention, a reinforced elastomer article having a crack or a cut therein, that is a crack/cut, is repaired by utilizing a cured elastomer patch usually having cords therein. The patch is used to repair the crack/cut which generally extends through the elastomer. The patch is generally applied on the non-initially cut or internal side of the article and the cut itself, if an opening exists, generally need not be filled. Portion 15 of the article is shown having a cut or crack therein. For the purposes of the present invention, the cut or crack (crack/cut) generally extends throughout the entire article such that it is in need of repair. Article 10, such as a tire, conveyor belt or the like, generally has reinforcement therein such as in the form of cords 18. When crack 16 extends through the article retaining pressurized gas therein, such as a tire, the article will gradually lose pressure unless the loss of gas is stopped. The loss of air pressure in the tire makes it unsuitable for use.

The crack/cut can be caused by a number of items such as nails, bolts, screws, metal objects, rocks, spikes, equipment, and the like. The present invention is ideally suited for large off-the-road tires although it can also be applied to normal passenger car tires, truck tires, conveyor belts, and the like.

In order to repair the elastomer article, the interior side, or that side of the article opposite the initial cut penetration, is prepared for the application of the patch thereto. Such preparation generally includes removal of the tire innerliner layer as well as removal of one or more layers located immediately thereunder. Since usually the cords in the area of the crack/cut are often damaged, they can be severed outside of the damaged area and removed. Oftentime portions of two or more of the tire cords are removed. The remaining exposed area is then buffed via any conventional apparatus or treatment. It is then cleaned utilizing conventional solvents such as acetone, rubber solvent, and trichlorethane, and the like. Treating agent 30 is then applied to the cleaned area and allowed to dry. An amine curable polymer or prepolymer is then applied thereover. A cured patch 20 having a layer of treating agent 30 on one side thereof is then applied to the amine curable polymer or prepolymer layer 40. The thickness of the amine curable polymer or prepolymer 40 generally varies between 1/6" to ⅛" thick and covers the area buffed out.

Upon cure the repair obtained is usually equal to or stronger than the strength of the original article. Moreover, should the cut be large enough such that an opening exists on the exterior side, there is generally no need to fill said cut.

Another distinctive advantage of the present invention is that the amine curable polymer cures at ambient temperature. Thus, the repair can be made on the job site. That is, there is no need to take the tire or the article to the nearest retread shop or rubber repair shop which on some occasions may be hundreds of miles away.

Considering now the article to be repaired, or substrate 15, is a cured rubber or elastomer, having unsaturated groups therein. The substrate can be any conventional elastomer or rubber known to those skilled in the art. For example, it can be made from conjugated dienes having from 4 to 12 carbon atoms such as butadiene, isoprene, and the like. It can also be made from natural rubber, that is from a substance which is obtained from various trees and plants which grow in the tropics or desert portions of the world. Such natural rubber generally has a content in excess of 90 and usually in excess of 95 percent of cis-1,4-polyisoprene. The substrate can also be made from various elastomeric copolymers such as those made from monomers of conjugated dienes having from 4 to 12 carbon atoms as set forth above and vinyl substituted aromatic compounds having from 8 to 15 carbon atoms. Examples of such vinyl substituted aromatic, compounds include styrene, alpha-methylstyrene, and the like. An example of a specific copolymer is styrene-butadiene rubber.

Naturally, other types of rubber compounds can be utilized such as the so-called butyl rubbers, neoprene, that is polychloroprene, and the like, as well as blends of said above rubbers.

Suitable treating agents include the various N-halohydantoins, the various N-haloamides, the various N-haloimides, and combinations thereof. Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichhloro-5-methyl-5-hexyl hydantoin. Examples of N-haloamides include N-bromoacetamide and tetrachloroglycoluril. Examples of N-haloimides in include N-bromosuccinimide and the various chloro substituted s-triazinetriones, commonly known as mono-, di-, and trichloroisocyanuric acids. A preferred treating composition for use in the practice of the present invention are the various mono-, di-, or trichloroisocyanuric acids, or combinations thereof. Trichloroisocyanuric acid is especially preferred.

The treating agents usually exist in solid form. They are readily soluble in solvents such as acetone and the like and thus can be applied in liquid form. Application of the treating agent generally occurs at ambient temperatures. Application can occur through any conventional manner as through brushing, spraying, and the like. The amount applied is such that the rubber substrate surface is coated. Preferably, two or more coats of the treating agent or adhesive compound is used to ensure that all the cured rubber substrate surface has been coated.

A typical amount of the treating agent in the suitable solvent, for example ethyl acetate or acetone, is generally from about 0.1 to about 10 percent by weight based upon the total weight of said treating agent and solvent, and preferably from about 0.5 percent to about 5 percent. Of course, higher or lower concentrations can be utilized. This solvent system has been found to dry within a matter of minutes so that the amine curable polymer or prepolymer can be bonded thereto. It is thought that the adhesive treating system adds halogen groups, for example, chlorine to the cured rubber which activates the cured rubber surface allowing the amine curable polymer or polymer system to adhere strongly to the cured rubber surface.

Of the various amine curable polymers or prepolymers, the urethanes are preferred. Other prepolymers or polymers which can be cured with the amine curing agent include the compounds set forth in U. S. Pat. No. 3,755,261 which is hereby fully incorporated by reference. Briefly, such compounds are the various epoxy resins such as those disclosed in the "Encyclopedia of Polymer Science and Technology" Interscience Publishers, New York (1967), Volume 6, pages 212-221; halogen-containing hydrocarbon polymers such as chloroprene polymers, chlorinated butyl rubber, and chlorinated polyethylene and polypropylene; chlorosulfonated polymers such as those described in U. S. Pat. No. 2,723,257; polymers containing acid halide groups such as

and haloformate group such as

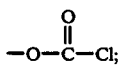

polymers containing anhydride groups which on reaction with diamines yield amide-acid linkages, and organo-polysiloxanes as described in U. S. Pat. No. 2,938,010.

The urethane prepolymers or polymers, that is, those which contain isocyanate groups, are generally formed by first reacting a polyether polyol or a polyester polyol with a molar excess of a diisocyanate to form a prepolymer having terminal isocyanate groups. The polymer is then cured to increase its molecular weight from less than about 3,000 upwards to over 10,000. Examples of such polymers are set forth in U.S. Pat. Nos. 2,620,516; 2,777,831; 2,843,568; 2,866,774; 2,900,368; 2,929,800; 2,948,691; 2,948,707; and 3,114,735, all of which are hereby fully incorporated by reference. Typical specific examples of such polyurethanes include Adiprene L-367, polytetramethylene ether glycol containing approximately 6.4 percent isocyanate end groups by weight, manufactured by DuPont; Adiprene L-42, polytetramethylene ether glycol containing approximately 2.8 percent isocyanate end groups by weight, manufactured by DuPont; and Cyanaprene A-7, a polyester-based coating polymer with approximately 2.4 percent isocyanate end groups, manufactured by American Cyanamid. Blends of these polyurethanes can also be utilized. Moreover, it has been found, particularly with repair or application of the amine curable polymer to the patch area, that is the area between patch 20 and cured substrate 11, better adhesion is often obtained by utilizing two different types of urethane. For example, a urethane containing a high amount by weight of isocyanate end groups such as Adiprene L-367 can be blended with a urethane containing a low amount by weight of isocyanate end groups such as Adiprene L-42. The amount of one urethane to the other can range from about 1 to about 99 percent and desirably from about 30 to about 70 percent by weight.

To the amine curable prepolymer or polymer compound is added a conventional amine curing agent, known to those skilled in the art. Generally, any conventional or known amine curing agent can be used and, hence, only a few specific examples will be given. Thus, the curing agent can be MOCA, that is 4,4'-methylene bis(2-chloroaniline) or, desirably a complex of 4,4'-methylene dianiline and a salt, or a complex of racemic 2,3-di-(4-aminophenyl) butane and a salt, as set forth in U. S. Pat. No. 3,755,261 to VanGulick which is hereby fully incorporated by reference. The latter two complexes are preferred. The methods for preparing the complexes are set forth in U.S. Pat. No. 3,755,261. A preferred salt utilized with the 4,4'-methylene dianiline compound is sodium chloride or lithium chloride. Due generally to availability and costs, the complexes or salts derived from 4,4'-methylene dianiline are highly preferred. Another class of amine curing agents which can be utilized are the various Versamides, that is the condensation products of polyamines and d.b:asic acids obtained when certain unsaturated fatty acids are polymerized, and are manufactured by Henkel Chemical Company.

The equivalent weight of the curing agent utilized with regard to the curable prepolymer or polymer, including the amine curing agent, generally ranges from about 85 percent to 115 percent with from about 95 to 105 percent being preferred.

Often to facilitate processing, the curing agent, and especially an amine curing agent such as the complex of 4,4'-methylene dianiline and a salt is utilized with a plasticizer such as dioctylphthalate on a 50 percent weight basis, or Flexol 4-GO, tetraethylene glycol bis(2-ethyl hexanoate) manufactured by Union Carbide Corporation on a 50 percent weight basis. The amount of plasticizer can range from about 20 percent to about 60 weight percent.

The curing agent is blended with the prepolymer or polymers in various mixers such as dough mixers, high speed impellers, paddle-type mixers, and the like. Small batches can be mixed by stirring with a spatula. Usually, the prepolymer or polymer is a liquid. If not, when mixed with the polar solvent, a liquid mixture results. However, even if a solid curing agent is used, when added to the prepolymer or the polymer, and to a solvent system, a liquid system results even though the curing agent (e.g., amine) can be in the form of a dispersion. Thus, even though the system may contain solids therein, the solids exist in the form of a dispersion so that a liquid system is produced.

The curing agent and the amine curable polymers or prepolymers form the curable polymer system which is mixed with a polar solvent so that a liquid system is obtained which cures at ambient or room temperature, that is, the prevailing temperature as from about 10° C. to about 50° C. Often the ambient temperature will range from about 15° C. to about 35° C. or 40° C. The polar solvents which can be utilized, especially with the amine curing agent and the amine polymers or prepolymers are, for example, set forth in U.S. Pat. No. 3,888,831 to Kogon which is hereby fully incorporated by reference. Generally, the amount of solvent utilized per 100 parts by weight of the curable prepolymer or polymer ranges from about 2 to about 40, desirably from about 2 to about 20, and preferably from about 5 to about 15 parts by weight. Specific examples of preferred solvents include dimethylformamide, tetrahydrofuran, cyclohexanone, ethyl acetate, nitromethane, nitroethane, nitropropane, methyl ethyl ketone., and acetone. Acetone and methyl ethyl ketone are highly preferred. The amount of curing agent, based upon said polymer or prepolymer, ranges from about 0.85 to about 1.15 equivalents.

Considering patch 20, it can generally be of any desired size so long as it adequately covers the surface area of the aperture. Generally, an appropriate patch size will be known to one skilled in the art of patch construction and/or patch application. The patch is made of rubber and is generally fully cured. Although cured natural rubber of a composition containing at least 80 percent by weight of natural rubber is often preferred, any conventional type of cured rubber compound can be utilized. Thus, the patch can be made substantially from a conjugated diene having from 4 to 12 carbon atoms, copolymers made from conjugated dienes having from 4 to 12 carbon atoms with vinyl substituted aromatics having from 8 to 15 carbon atoms, for example styrene butadiene rubber, and the like. In essence, the patch can be made out of the same type of rubber as the substrate. Often, the patch will have a cushioned layer thereon to alleviate stresses formed between the tire carcass and tire patch. However, this is not always necessary.

Since in the preferred embodiment of the present invention the substrate has cords therein, desirably the patch also has cords therein. More specifically, whenever approximately 25 percent to about 50 percent of the cords are damaged, severed, broken, etc., the strength of the cords in the patch is approximately equal to the strength of the total cords in the article before any injury thereto. However, should approximately 50 percent to 100 percent of all cords be damaged, severed, or otherwise in3ured, the strength of the cords in the patch is equal to the strength of the total cords in the article before injury thereto. Should the number of damaged cords in the article be less than approximately 25 percent, then, the strength of the remaining cords is usually adequate such that a reinforced patch need not be utilized. The cords in the patch can be made of polyester, nylon, steel, rayon and the like, with nylon being preferred.

The area around the cut or crack is buffed and cleaned as set forth above. The treating agent 30 is applied and then the amine curable polymer or prepolymer is applied. Treating agent 30 is also applied to one side of the patch. The ends of the patch can be taped to the substrate or held in place with a curing tube located inside the tire. The number of cords of the patch is as previously set forth. While the patch is held in place, the amine curable polymer or prepolymer cures at ambient temperatures.

In forming the amine curable polymer system, generally the amine curable polymer or prepolymer is mixed with the polar solvent and then the curing agent is added last. During cure, an effective and strong bond is formed between the prepolymer or polymer system and the treated elastomer substrate. Since the present invention relates to an ambient temperature cure, repair of large and cumbersome articles such as off-the-road tires, conveyor belts, and the like, can be made in situ. In other words, the repair can be made at the job site. The only accessory which may be required is a pneumatic bladder, although a sand bag can be used. In extreme cold weather it is desirable to bring the damaged area of the tire, through the use of heating pads, up to ambient temperature. Since the cure is ambient, no steam chambers, or other vulcanizable tire repair equipment are required. This, of course, also results in an energy savings.

It is to be understood that various conventional additives in typical amounts can be added to the amine curing agent and prepolymer system such as colorants, softeners, fillers, antioxidants, plasticizers, and the like.

The invention will be better understood by reference to the following representative examples.

EXAMPLES

A tire which was determined to have an air leak was repaired in accordance with the present invention as follows:

The interior portion of the tire at which the air leak was determined was thoroughly buffed utilizing an OTR buffing tool. In this manner, the innerliner and the tiegum layer were removed down to the first body ply. Then, any damaged body cords were carefully removed. The buffed portion was then cleaned by vacuuming out the last traces of any buffing dust and the like. Next the buffed area was thoroughly cleaned with acetone on Rymplecloth. Generally, the area buffed and cleaned was about 12" to 24" to 12" to 24", then, a patch of a size set forth in the table was lightly buffed and cleaned in the same manner. The treating agent was applied in several coats as a 3 percent solution of tri-chloro-s-triazinetrione in ethyl acetate. This was allowed to dry. Then, the amine curable urethane system was applied which comprise the following two components: "A" side, 150 gm adiprene L-367, 150 gm adiprene 42, 30 gr 460 and 30 gm of acetone; "B" side, 73 gm caytur 21.

The thoroughly mixed polyurethane was then coated on to the buffed area of the tire and also to the reinforcing patch which was fully cured and contained no uncured layer. The patch containing the urethane thereon was applied to the buffed portion of the tire which had also previously been treated with the treating agent. The patch was taped into place and firmly held by inflating a curing tube inside the tire. After standing approximately 16–18 hours at an ambient temperature, tape was removed and the tire was placed back into service. The following results were obtained.

TABLE

| TIRE # | TIRE SIZE | PATCH SIZE | ORIGINAL HOURS | REPAIR HOURS | RECENT STATUS |
|---|---|---|---|---|---|
| 1 | 36.00 × 51 | 12" × 12" | 2606 | 1587 | Worn Out |
| 2 | " | 12" × 12" | 2763 | 984 | Worn Out |
| 3 | " | 12" × 12" | 2068 | 1371 | Off, second rock cut in the tire |
| 4 | " | 12" × 12" | 671 | 1647 | Still in Service |
| 5 | " | 15" × 15" | 2784 | 744 | Off, second rock cut in the tire |
| 6 | " | 18" × 18" | 1643 | 575 | Off, patch failed |

As readily apparent from the Table, patches were quite effective in that in Tires #1 and #2 the tire actually wore out. The remaining tires are still in service or have obtained a second rock cut or the patch failed (not the adhesive). With regard to Tire #6, it is noted that the first repair failed because of a weak patch. However, upon replacement with a stronger patch, the performance of the repair improved.

From the above Table, it can be seen that a patch according to the present invention is very effective in repairing the tire as well as sealing air leaks therein.

What is claimed:

1. A process for repairing a cured reinforced elastomer article having crack therethrough comprising the steps of:
   applying a treating agent to a patch area, said patch area located on the interior side of the article and in the vicinity of said crack, said elastomer having unsaturated groups therein, said treating agent selected from the group consisting of N-halohydantoins, N-haloamides, N-haloimides and combinations thereof;
   applying an amine curable polymer or prepolymer system to said patch area;
   and applying a patch to said patch area; and
   curing said amine curable polymer or prepolymer at ambient temperature.

2. A process according to claim 1, wherein said article has cords therein, and wherein said patch has cords therein.

3. A process according to claim 2, wherein said amine curable polymer or prepolymer system comprises a polar solvent, an amine curable polymer or prepolymer, and an amine curing agent, said polar solvent is selected from a compound having dipole moments in excess of 0.4 debye in which there are no more than a total of 8 $CH_3-$, $CH_2$, or tertiary carbon radicals per polar group contained in said compound, benzene, and biphenyl; and said amine curable polymer or prepolymer is selected from the group consisting of (a) epoxy resins; (b) halogen-containing hydrocarbon polymers; (c) chlorosulfonated polymers; (d) polymers containing acid halide groups such as

or haloformate groups such as

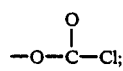

(e) polymers containing anhydride groups which, on reaction with diamines, yield amide-acid linkages, (f) organopolysiloxanes; (g) urethane polymers or prepolymers; and combinations thereof.

4. A process according to claim 3, wherein said treating agent is selected from the group consisting of 1,3-dichloro-5,5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; N-bromosuccinimide, mono-, di-, or trichloroisocyanuric acid, and wherein said ambient temperature cure is at a temperature of from about 10° C. to about 50° C.

5. A process according to claim 3, wherein said treating agent is selected from the class consisting of monochloroisocyanuric acid, dichloroisocyanuric acid, trichloroisocyanuric acid, and combinations thereof, and wherein said polar compound ranges from about 2 to about 40 parts per 100 parts of said prepolymer or polymer and is selected from the group consisting of esters, ketones, ethers, halogenated hydrocarbons, tertiary amines, nitrile paraffins, fully substituted amides, sulfones, sulfoxides, and sulfides.

6. A process according to claim 5, wherein said amine curable polymer or prepolymer is said urethane polymer or prepolymer and including applying said treating agent to said patch.

7. A process according to claim 6, wherein said polar solvent is selected from the group consisting of dimethylformamide, tetrahydrofuran, cyclohexanone, ethyl acetate, methyl ethyl ketone, and acetone, and wherein said amine curing agent is selected from the group consisting of (a) 4,4'-methylene bis(2-chloraniline), (b) a complex of. 4,4'-methylene dianiline and a salt, said salt being selected from the group consisting of sodium chloride, sodium bromide, sodium iodide, sodium nitrite, lithium chloride, lithium bromide, lithium iodide, lithium nitrite, and sodium cyanide, (c) a complex of racemic 2,3-di-4(aminophenyl)butane with a salt, said salt selected from the group consisting of sodium chloride, sodium bromide, sodium iodide, potassium chloride, potassium bromide, potassium iodide, cesium chloride, cesium bromide, and cesium iodide, the ratio of said dianiline or said butane to said salt in said complex being 3 moles to 1 mole, the equivalent amount of said curing agent based upon said prepolymer or polymer ranging from about 0.85 to about 105.

8. A process according to claim 7, wherein the cords in said patch are of a strength approximately equal to or greater than the strength of cords in said article.

9. A process according to claim 8, wherein said patch area is a cavity, wherein said cavity contains approximately 25 to about 50 percent of broken or severed cords, and wherein the strength of cords in said patch is approximately equal to the strength of said broken cords before being broken.

10. A process according to claim 14, wherein said patch area is a cavity, wherein said cavity has from 50 to about 100 percent of broken or severed cords, and wherein the strength of cords in said patch is approximately equal to or greater than the strength of said cords in said article.

11. A process according to claim 10, wherein said elastomer article is a tire.

12. A process according to claim 2, wherein said interior patch area is created by removal of one or more of said cords in the vicinity of said crack.

13. A process according to claim 3, wherein said interior patch area is created by removal of one or more of said cords in the vicinity of said crack.

14. A process according to claim 5, wherein said interior patch area is created by removal of one or more of said cords in the vicinity of said crack.

15. A process according to claim 6, wherein said interior patch area is created by removal of one or more of said cords in the vicinity of said crack.

16. A process according to claim 7, wherein said interior patch area is created by removal of one or more of said cords in the vicinity of said crack, wherein the exterior side of said article in the vicinity of said crack is free of said amine curable polymer or prepolymer, and wherein the repair is in-situ.

17. A process according to claim 8, wherein said interior patch area is created by removal of one or more of said cords in the vicinity of said crack, wherein the exterior side of said article in the vicinity of said crack is free of said amine curable polymer or prepolymer, and wherein the repair is in-situ.

18. A process according to claim 10, wherein said interior patch area is created by removal of one or more of said cords in the vicinity of said crack, wherein the exterior side of said article in the vicinity of said crack is free of said amine curable polymer or prepolymer, and wherein the repair is in-situ.

* * * * *